(12) United States Patent
Reese et al.

(10) Patent No.: US 10,780,575 B2
(45) Date of Patent: Sep. 22, 2020

(54) ROBOT END EFFECTOR CUFF

(71) Applicant: PHD, Inc., Fort Wayne, IN (US)

(72) Inventors: Cale M. Reese, Fort Wayne, IN (US);
James M. Davis, Grabill, IN (US);
Brian M. Sutter, Hoagland, IN (US);
Scott A. Shepherd, Hoagland, IN (US)

(73) Assignee: PHD, Inc., Fort Wayne, IN (US)

( * ) Notice: Subject to any disclaimer, the term of this patent is extended or adjusted under 35 U.S.C. 154(b) by 135 days.

(21) Appl. No.: 15/979,647

(22) Filed: May 15, 2018

(65) Prior Publication Data

US 2018/0370026 A1    Dec. 27, 2018

Related U.S. Application Data

(60) Provisional application No. 62/523,449, filed on Jun. 22, 2017.

(51) Int. Cl.
| | |
|---|---|
| *B25J 9/08* | (2006.01) |
| *B25J 15/00* | (2006.01) |
| *B25J 19/00* | (2006.01) |
| *B25J 18/00* | (2006.01) |

(52) U.S. Cl.
CPC ............. *B25J 9/08* (2013.01); *B25J 15/00* (2013.01); *B25J 19/0029* (2013.01); *B25J 18/00* (2013.01); *Y10S 901/36* (2013.01)

(58) Field of Classification Search
CPC ......... B25J 19/0029; B25J 9/08; Y10S 901/36
USPC ...................................... 74/490.02
See application file for complete search history.

(56) References Cited

U.S. PATENT DOCUMENTS

| | | | |
|---|---|---|---|
| 4,545,723 A | 10/1985 | Clark | |
| 4,691,419 A * | 9/1987 | Keeler | H05K 13/0473 140/105 |
| 4,693,663 A * | 9/1987 | Brenholt | B25J 9/047 414/735 |
| 4,883,939 A | 11/1989 | Sagi | |
| 5,782,571 A | 7/1998 | Hufford et al. | |
| 6,893,070 B2 | 5/2005 | Baker | |
| 7,118,452 B2 | 10/2006 | Wood | |
| 8,496,425 B2 | 7/2013 | Lin et al. | |

(Continued)

FOREIGN PATENT DOCUMENTS

| | | |
|---|---|---|
| DE | 195 33 948 A1 | 5/1996 |
| EP | 1 250 977 A1 | 10/2002 |

(Continued)

OTHER PUBLICATIONS

Machine Translation of Gamerdinger, DE 195 33 948, Google Patents, Mar. 17, 2020.*

(Continued)

*Primary Examiner* — Patrick Cicchino
(74) *Attorney, Agent, or Firm* — Taylor IP, P.C.

(57) ABSTRACT

A robotic system including a robot and an end effector cuff connected to the robot. The end effector cuff has a body and includes at least one fluid inlet, at least one fluid port fluidly connected to the at least one fluid inlet, at least one fluid valve fluidly connected to the at least one fluid port and housed within the body of the end effector cuff, and an electronic control unit operably coupled to the robot and housed within the body of the end effector cuff. The robotic system also includes an end effector connected to the end effector cuff.

17 Claims, 4 Drawing Sheets

(56) References Cited

U.S. PATENT DOCUMENTS

| | | | |
|---|---|---|---|
| 9,630,315 B2 | 4/2017 | Cookson et al. | |
| 2013/0260606 A1* | 10/2013 | Hahakura | H01R 13/60 |
| | | | 439/534 |
| 2016/0089794 A1* | 3/2016 | Niu | B25J 19/0029 |
| | | | 74/490.02 |
| 2016/0136809 A1* | 5/2016 | Subotincic | B25J 9/1697 |
| | | | 700/259 |
| 2017/0217013 A1 | 8/2017 | Iqtidar et al. | |

FOREIGN PATENT DOCUMENTS

| | | |
|---|---|---|
| JP | 61-33881 A | 2/1986 |
| JP | 2010-125555 A | 6/2010 |
| JP | 2017-100239 A | 6/2017 |

OTHER PUBLICATIONS

Extended European Search Report dated Jul. 1, 2019 for European Patent Application No. 18 17 5941 (12 pages).
European Communication dated Jan. 15, 2019 for European Patent Application No. 18 17 5941 (13 pages).

\* cited by examiner

ROBOT END EFFECTOR CUFF

CROSS REFERENCE TO RELATED APPLICATIONS

This is a non-provisional application based upon U.S. provisional patent application Ser. No. 62/523,449, entitled "COLLABORATIVE ROBOT END EFFECTOR CUFF", filed Jun. 22, 2017, which is incorporated herein by reference.

BACKGROUND OF THE INVENTION

1. Field of the Invention

The present invention relates to robotic systems, and, more particularly, to a robotic system with an end effector cuff.

2. Description of the Related Art

Robotic systems generally include a robot with one or more end effector(s) in order to perform various tasks on a workpiece. End effectors may include jaws, grabbers, or grippers for seizing and moving the workpiece. End effectors are typically connected directly to the end of the robot arm. Some end effectors may be pneumatically actuated. These pneumatic end effectors commonly include grippers with two or more opposing grip pickup arms which close together to grip the workpiece.

Most pneumatic end effectors need multiple pneumatic lines, pneumatic valve(s), electrical lines for position sensors or switches, and electrical power for the valve(s) to actuate the pneumatic end effector. Typically, these lines are externally mounted onto the robot and/or the pneumatic end effector. In a given robotic system, there may be numerous, externally mounted pneumatic and electrical lines that can potentially be loose and disorderly. The robotic system may also include externally mounted pneumatic valve(s). Additionally, the externally mounted pneumatic and electrical lines may lead to the potential need to supply externally mounted interface circuitry between the robot, pneumatic valve(s), and sensors. These externally mounted pneumatic and electrical lines, pneumatic vales(s), and interface circuitry can be cumbersome and unsightly and may even be a hindrance to work productivity. Further, each end effector typically has a unique mounting pattern that may not be compatible with different kinds of collaborative robots.

What is needed in the art is a mechanical device that efficiently and cost-effectively connects an end effector to a robot.

SUMMARY OF THE INVENTION

The present invention provides a robotic system that includes a robot, an end effector cuff, an optional transition plate, and an end effector. The end effector cuff includes various mounting features and mounting geometry in order to integrate pneumatic valves and electrical circuitry within the body of the end effector cuff.

The present invention in one form is directed to a robotic system that includes a robot and an end effector cuff connected to the robot. The end effector cuff has a body and includes at least one fluid inlet, at least one fluid port fluidly connected to the at least one fluid inlet, at least one fluid valve fluidly connected to the at least one fluid port and housed within the body of the end effector cuff, and an electronic control unit operably coupled to the robot and housed within the body of the end effector cuff. The robotic system also includes an end effector connected to the end effector cuff.

The invention in another form is directed to a robotic system including a robot and an end effector cuff connected to the robot. The end effector cuff has a body and includes at least one fluid inlet, at least one fluid port fluidly connected to the at least one fluid inlet, at least one fluid valve fluidly connected to the at least one fluid port and housed within the body of the end effector cuff, and an electronic control unit operably coupled to the robot and housed within the body of the end effector cuff. The robotic system also includes a transition plate connected to the end effector cuff, and an end effector connected to the transition plate.

The invention in another form is directed to an end effector cuff that has a body and includes at least one fluid inlet, at least one fluid port fluidly connected to the at least one fluid inlet, at least one fluid valve fluidly connected to the at least one fluid port and housed within the body of the end effector cuff, and an electronic control unit housed within the body of the end effector cuff. The end effector cuff is configured for being compatible with different types of robots and the end effector cuff is configured for connecting an end effector to any one of the aforementioned robots.

An advantage of the present invention is that the electrical circuitry and pneumatic valve(s) are integrated into the end effector cuff.

Another advantage of the present invention is that the end effector cuff requires only one pneumatic air inlet line and the electrical power is provided from the collaborative robot electrical connector.

Yet another advantage of the present invention is that the end effector may be cost-effectively and efficiently coupled with several types of collaborative robots via the end effector cuff and/or the transition plate.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DESCRIPTION OF INVENTION

Figure 1:
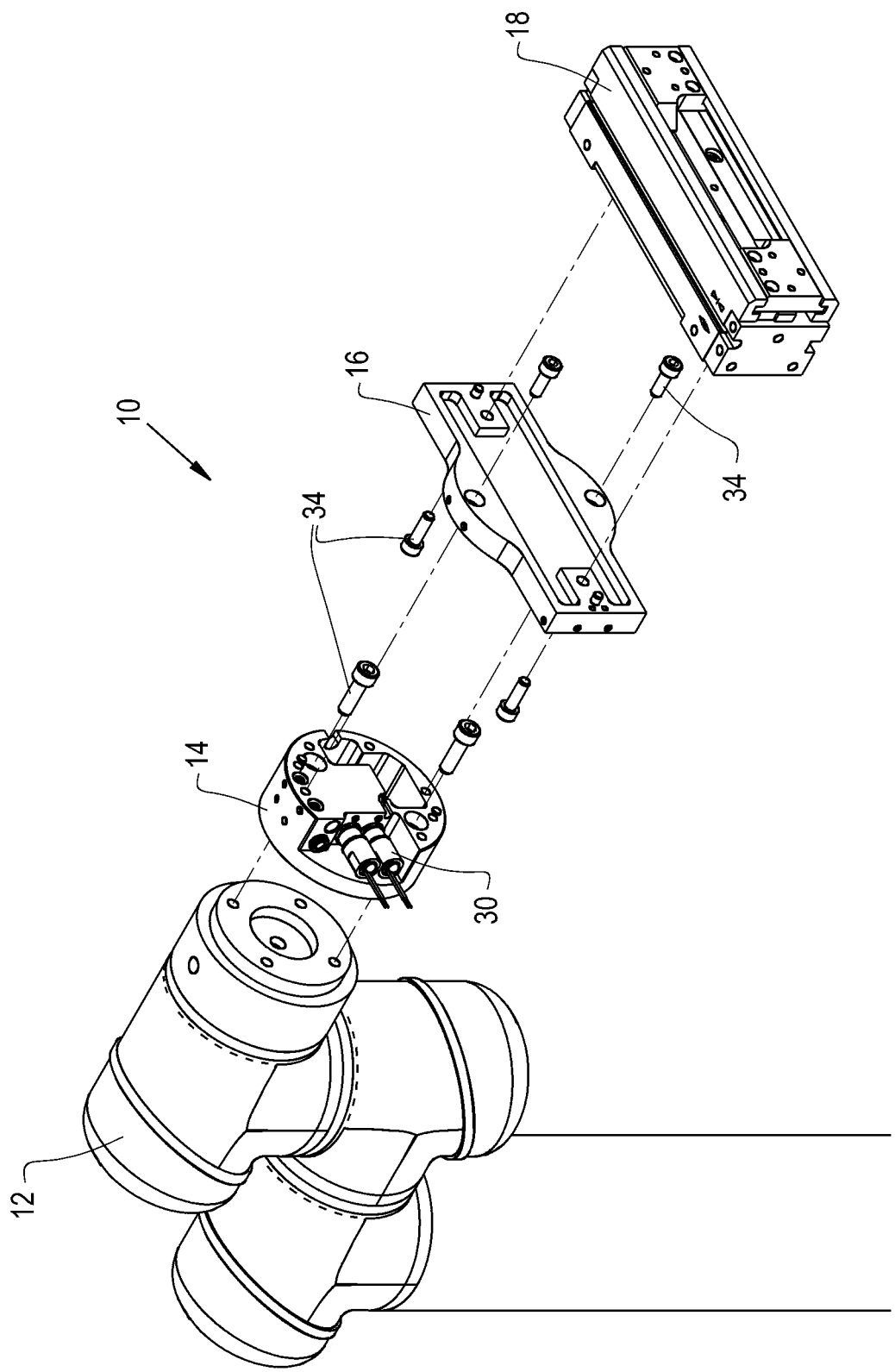
FIG. 1 illustrates an isometric exploded view of an end effector cuff and transition plate mounted to a robot according to an embodiment of the present invention.
Figure 2:
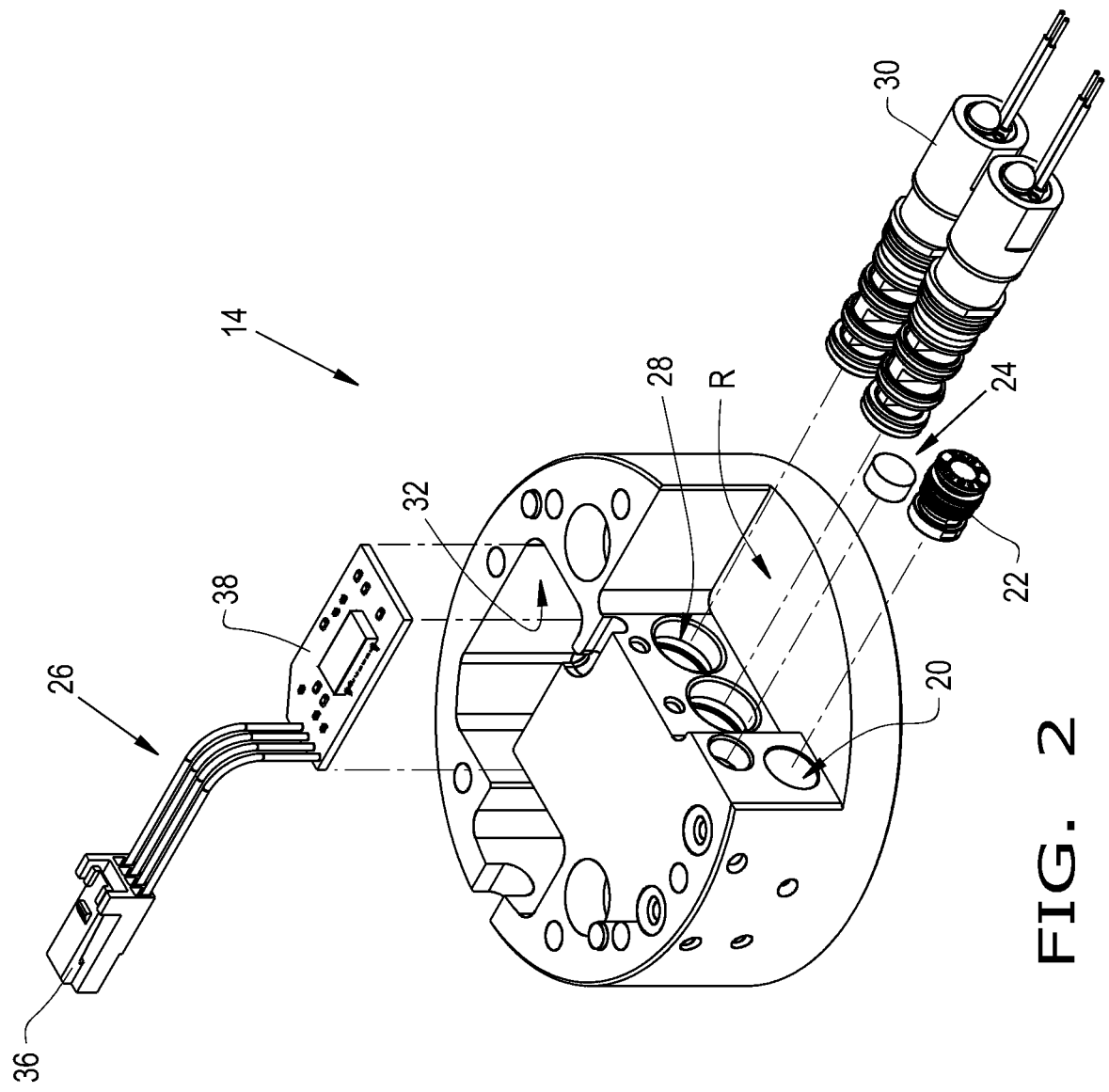
FIG. 2 shows an isometric exploded view of the end effector cuff as shown in FIG. 1.
Figure 3:
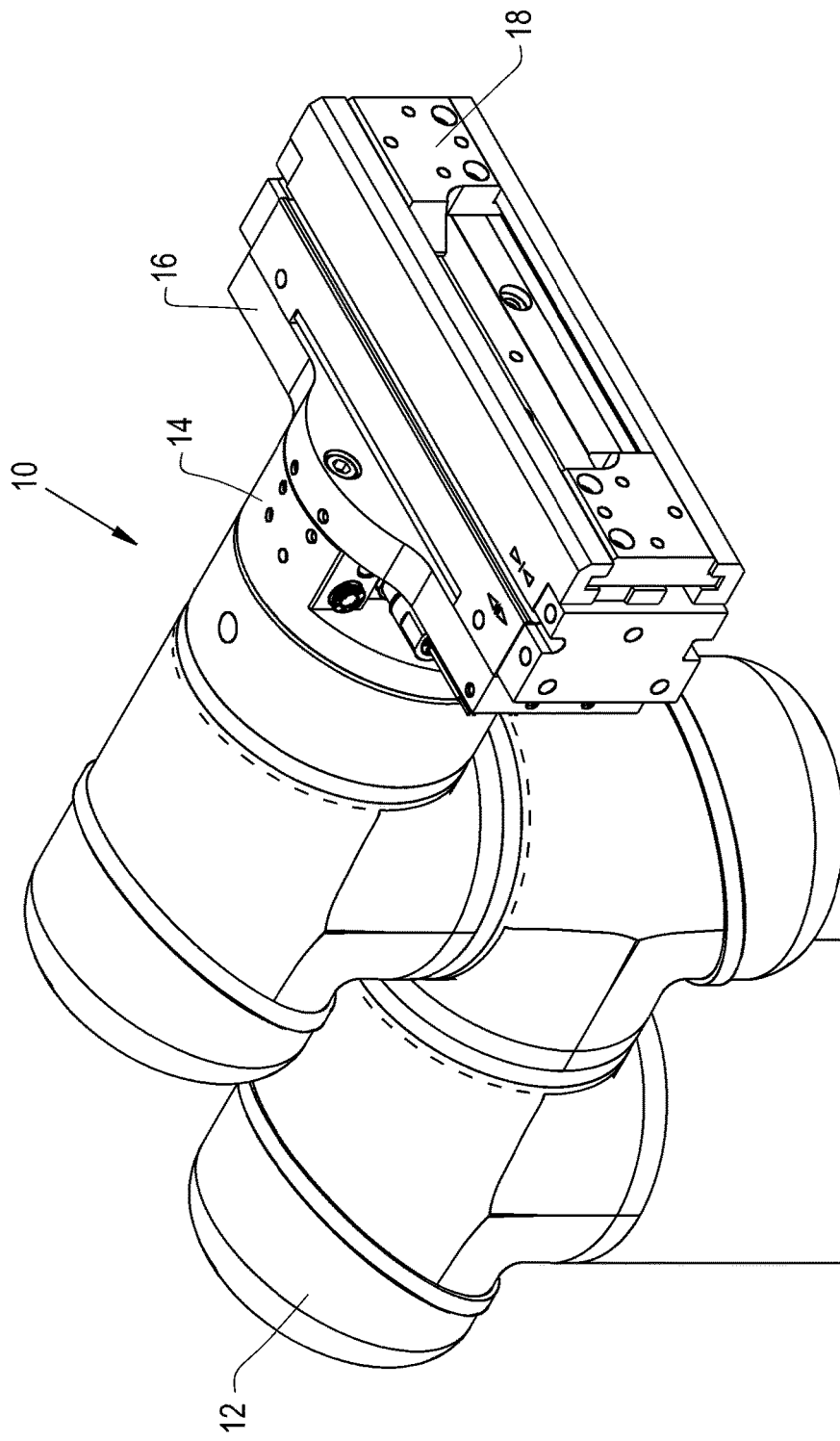
FIG. 3 shows an isometric view of the robotic system of FIG. 1 as assembled.

Referring now to the drawings, and more particularly to FIGS. 1-3, there is shown a robotic system 10 which generally includes a robot 12, an end effector cuff 14, an optional transition plate 16, and an end effector 18.

The robot 12 may be in the form of any desired robot 12. The robot 12 may be a single or multi-axis robot, including a Cartesian robot, a SCARA robot, a collaborative and/or an industrial robot. In the present embodiment, the robot 12 is in the form of a collaborative robot 12, which may be used in collaboration with a human worker. The robot 12 may include force and/or power limiting features such that the robot 12 may sense abnormal forces and stop or reverse its action. The robot 12 may also substantially cover its internal systems and may have rounded surfaces. The robot 12 may also include an electrical power supply and an electrical connector which are configured for connecting to and supplying electrical power to the end effector cuff 14 and/or the end effector 18.

The end effector cuff 14 is connected to the robot 12. The end effector cuff 14 may be configured for adapting the end effector 18 to the robot 12 and/or for housing the necessary components for operating the end effector 18. The end effector cuff 14 may include one or more fluid inlet(s) 20 with accompanying inlet fitting(s) 22, a fluid exhaust 24, and electrical hardware 26 (FIG. 2). The end effector cuff 14 may also include fluid port(s) 28 to couple with fluid valve(s) 30 integrated into the end effector cuff 14. In the present embodiment, the end effector cuff 14 only has one fluid inlet 20 that feeds two fluid valves 30.

The end effector cuff 14 may also include various mounting features and mounting geometry for physically and operably connecting to the robot 12. For example, the end effector cuff 14 may include all of the mounting features and mounting geometry between the collaborative robot 12 and the pneumatic end effector 18, with or without an accompanying transition plate 16. Additionally, for example, the end effector cuff 14 may include a mounting space 32, e.g. a cutout, groove, slot, depression, etc., that is configured to accommodate the electrical hardware 26 (FIG. 2). The back of the transition plate 16 or the end effector 18 can enclose a front portion of the mounting space 32. Further, the body of the end effector cuff 14 may include a recess R for housing and protecting the fluid valve(s) 30 (FIG. 2). The recess R may be in the form of a cutout which defines a back wall, a bottom wall, and an inner wall. The front portion of the recess R may be open such that when the robotic system 10 is assembled, the back of the transition plate 16 or the end effector 18 forms a front wall to enclose the recess R.

The end effector cuff 14 may be configured to accommodate numerous different types of robots 12. For example, the end effector cuff 14 may incorporate a universal, e.g. common, connection point in order to be compatible with numerous robots 12. In this regard, the end effector cuff 14 is configured for being compatible with the robot 12 at its first end, and the end effector 18 is configured for being compatible with the end effector cuff 14 and/or the transition plate 16 at its second end. The body of the end effector cuff 14 may correspond to the body of the robot 12. For instance, the body of the end effector cuff 14 may be circular and its outer diameter may match the diameter of the circular end of the robot 12. The end effector cuff 14 may be mounted to the robot 12 by one or more fasteners 34. The end effector cuff 14 may be composed of any desired material including a metal, a metal alloy, and a plastic material.

The electrical hardware 26 is configured for coupling to the robot 12 and controlling the fluid flow, end effector controls, and/or the operation of the robot 12 itself. The electrical hardware 26 may include one or more electrical connector(s) 36 that electrically couple to the robot 12 and an electronic control unit (ECU) 38 that couples to the electrical connector(s) 36 (FIG. 2). The electrical connector 36 and the ECU 38 are each housed within the mounting space 32 in the body of the end effector cuff 14. The electrical connector 36 may be in the form of any known connector. For example, the electrical connector 36 may be in the form of or similar to a Lumberg connector. The ECU 38 is operably coupled to the robot 12 via the electrical connector 36. The ECU 38 may be operably coupled to the fluid valves 30 and/or to the end effector 18. The ECU 38 may include software and various other hardware, including a circuit board, in order to control the robot 12, the fluid valve(s) 30, and/or the end effector 18. For example, the ECU may control the end effector proximity switches and feedback.

The fluid port(s) 28 may be fluidly coupled to the fluid inlet(s) 20 via internal conduits within the body of the end effector cuff 14. The fluid ports 28 may be in the form of receiving holes 28, which receive and couple to the fluid valve(s) 30. The fluid ports 28 may be positioned inwardly from the outer periphery of the end effector cuff 14, in order to provide an internal space to accommodate the fluid valve(s) 30. In more detail, a portion of the outer periphery of the end effector cuff 14 may be cut out such that the recess R is formed. The fluid ports 28 may be located on the inner wall of the recess R so that at least a portion of the fluid valve(s) 30 are housed within the recess R. For instance, the entire body of each fluid valve 30 may be positioned within the recess R (FIG. 1).

The fluid valves 30 may be in the form of pneumatic air valves 30, which can be operably connected to the end effector 18. The pneumatic air valve(s) 30 may be fed by, i.e., receive pressurized air from, the fluid inlet 20 by way of the fluid port(s) 28. The pneumatic air valve(s) 30 may be in the form of any known pneumatic valve(s), including 24 VDC MAC® Bullet Valves®.

The transition plate 16 may be connected in between the end effector cuff 14 and the end effector 18. The transition plate 16 operably connects the end effector 18 to the end effector cuff 14. The transition plate 16 may be uniquely designed to accommodate the end effector 18. In other words, the transition plate 16 is configured for efficiently connecting the end effector 18 to the robot 12 by way of being compatible with the end effector cuff 14. In this regard, the end effector 18 is capable of being integrated into numerous types of robots 12 via the transition plate 16 and the end effector cuff 14. The transition plate 16 may be mounted to the end effector cuff 14 and to the end effector 18 by known fasteners 34. The transition plate 16 may be composed of any suitable material including a metal or plastic material. It is conceivable to not include a transition plate 16 such that the end effector 18 may directly mount to the end effector cuff 14 via known fasteners.

The end effector 18 may be connected to the transition plate 16. The end effector 18 may be in the form of a pneumatic end effector 18. As the electrical hardware 26 and fluid valves 30 are integrated into the end effector cuff 14, the fluid and the electrical power which operate the end effector 18 may be provided by the end effector cuff 14. In this regard, the robotic system 10 of the present invention greatly reduces or eliminates externally mounted pneumatic tubing and electrical wiring. The end effector 18 may be mounted to the transition plate 16 by known fasteners 34.

Figure 4:
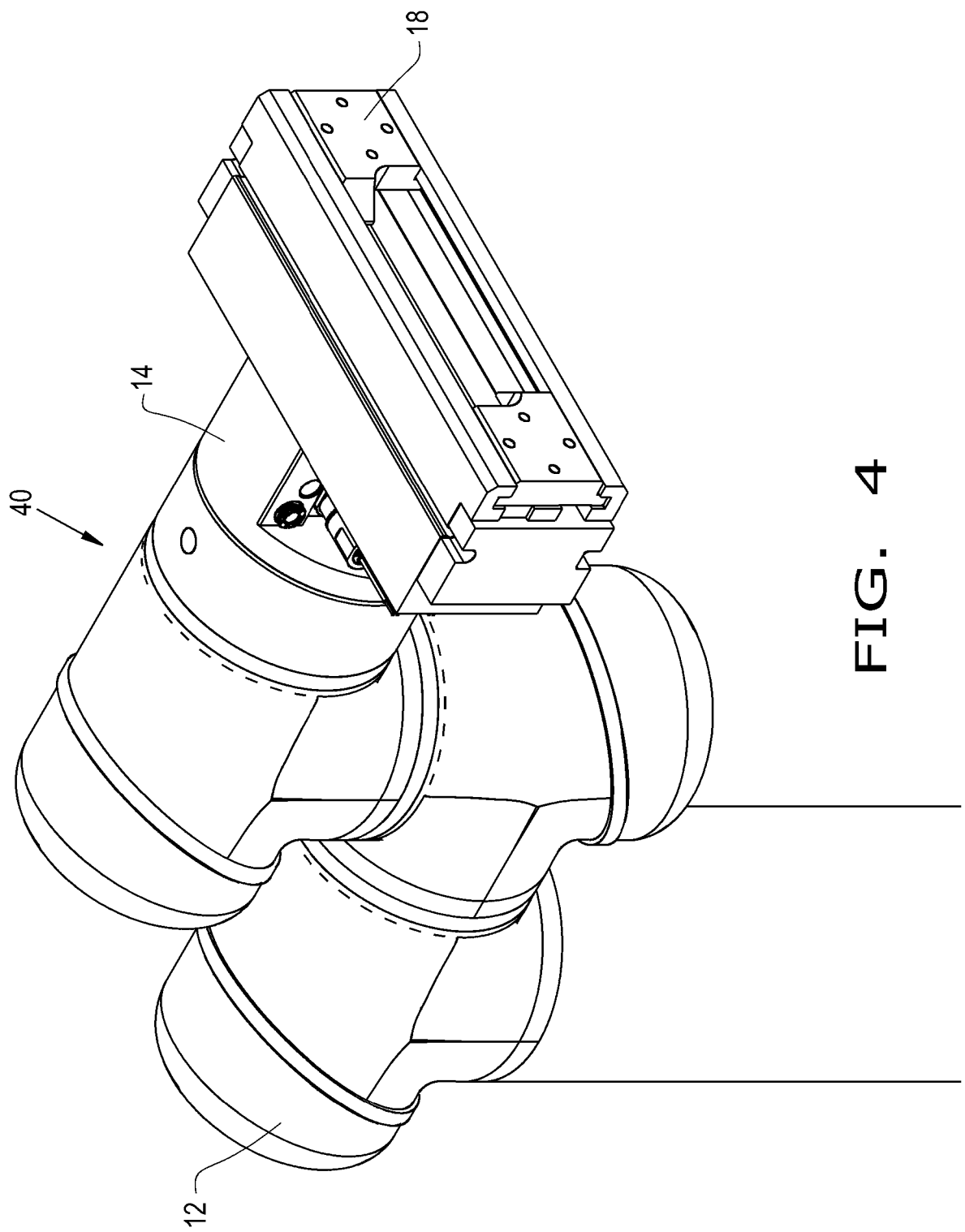
FIG. 4 illustrates another embodiment of a robotic system in which the end effector attaches directly to the end effector cuff.

Referring now to FIG. 4, there is shown another embodiment of the robotic system 40, which is the same as the robotic system 10 as described above except the robotic system 40 does not include a transition plate 16. Thereby, the end effector 18 may be directly connected to the end effector cuff 14 via known fasteners.

While this invention has been described with respect to at least one embodiment, the present invention can be further modified within the spirit and the scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A robotic system, comprising:
a robot;
an end effector cuff connected to the robot and including:
a cylindrical body including a first end connected to the robot, a second end opposite of the first end, a middle section, and an outer periphery, the body further including a recess in the form of a cutout in the outer periphery, the cutout extending radially inwardly into the second end and the middle section such that the recess is open;
at least one fluid inlet;
at least one fluid port fluidly connected to said at least one fluid inlet;
at least one fluid valve fluidly connected to said at least one fluid port and housed and protected within the recess of the body of the end effector cuff; and
an electronic control unit operably coupled to the robot and housed within the body of the end effector cuff; and
an end effector connected to the end effector cuff.

2. The robotic system of claim 1, wherein said recess has an inner wall, and said at least one fluid port is located on said inner wall such that said at least one fluid valve is housed and protected within said recess.

3. The robotic system of claim 1, wherein said body of the end effector cuff has a mounting space configured for housing the electronic control unit.

4. The robotic system of claim 1, wherein said at least one fluid inlet is in the form of only one fluid inlet.

5. The robotic system of claim 4, wherein said at least one fluid port is in the form of two fluid ports.

6. The robotic system of claim 5, wherein said at least one fluid valve is in the form of two fluid valves respectively fluidly connected to each said fluid port such that said fluid inlet feeds fluid to both of said fluid valves.

7. The robotic system of claim 1, wherein said electronic control unit is configured for controlling said at least one fluid valve.

8. The robotic system of claim 1, wherein said end effector cuff includes an electrical connector housed within the body of the end effector cuff, and said electrical connector is electrically coupled to the robot and to the electronic control unit such that the electronic control unit is operably coupled to the robot by way of said electrical connector.

9. A robotic system, comprising:
a robot;
an end effector cuff connected to the robot and including:
a cylindrical body including a first end connected to the robot, a second end opposite of the first end, a middle section, and an outer periphery, the body further including a recess in the form of a cutout in the outer periphery, the cutout extending radially inwardly into the second end and the middle section such that the recess is open;
at least one fluid inlet;
at least one fluid port fluidly connected to said at least one fluid inlet;
at least one fluid valve fluidly connected to said at least one fluid port and housed and protected within the recess of the body of the end effector cuff; and
an electronic control unit operably coupled to the robot and housed within the body of the end effector cuff;
a transition plate connected to the end effector cuff; and
an end effector connected to the transition plate.

10. The robotic system of claim 9, wherein said end effector cuff is configured for being compatible with said robot and said end effector is configured for being compatible with said transition plate such that said transition plate is configured for efficiently connecting the end effector to the robot.

11. The robotic system of claim 9, wherein said recess has an inner wall, and said at least one fluid port is located on said inner wall such that said at least one fluid valve is housed and protected within said recess.

12. The robotic system of claim 9, wherein said body of the end effector cuff has a mounting space configured for housing the electronic control unit.

13. The robotic system of claim 9, wherein said at least one fluid inlet is in the form of only one fluid inlet, and said at least one fluid port is in the form of two fluid ports.

14. The robotic system of claim 13, wherein said at least one fluid valve is in the form of two fluid valves respectively fluidly connected to each said fluid port such that said fluid inlet feeds fluid to both of said fluid valves.

15. The robotic system of claim 9, wherein said end effector cuff includes an electrical connector housed within the body of the end effector cuff, and said electrical connector is electrically coupled to the robot and to the electronic control unit such that the electronic control unit is operably coupled to the robot by way of said electrical connector.

16. An end effector cuff, comprising:
a cylindrical body including a first end, a second end opposite of the first end, a middle section, and an outer periphery, the body further including a recess in the form of a cutout in the outer periphery, the cutout extending radially inwardly into the second end and the middle section such that the recess is open;
at least one fluid inlet;
at least one fluid port fluidly connected to said at least one fluid inlet;
at least one fluid valve fluidly connected to said at least one fluid port and housed and protected within the recess of the body of the end effector cuff; and
an electronic control unit housed within the body of the end effector cuff, wherein said end effector cuff is configured for being compatible with different types of robots and said end effector cuff is configured for connecting an end effector to any one of said robots.

17. The end effector cuff of claim 16, wherein said body of the end effector cuff has a mounting space configured for housing the electronic control unit.

* * * * *